Figure 3:
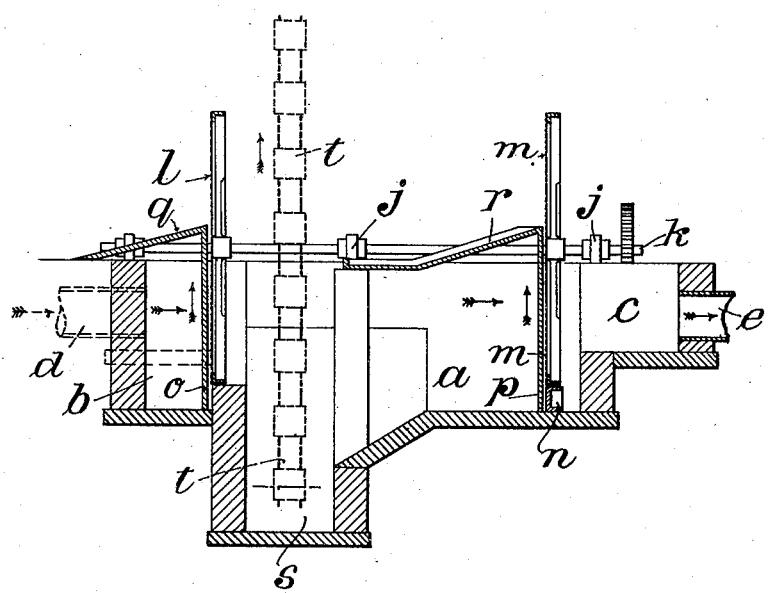

E. V. CHAMBERS & T. C. HAMMOND.
APPARATUS FOR SEPARATING AND RECOVERING FIBERS AND THE LIKE FROM LIQUIDS.
APPLICATION FILED MAR. 19, 1913.
1,079,975.
Patented Dec. 2, 1913.
2 SHEETS—SHEET 1.
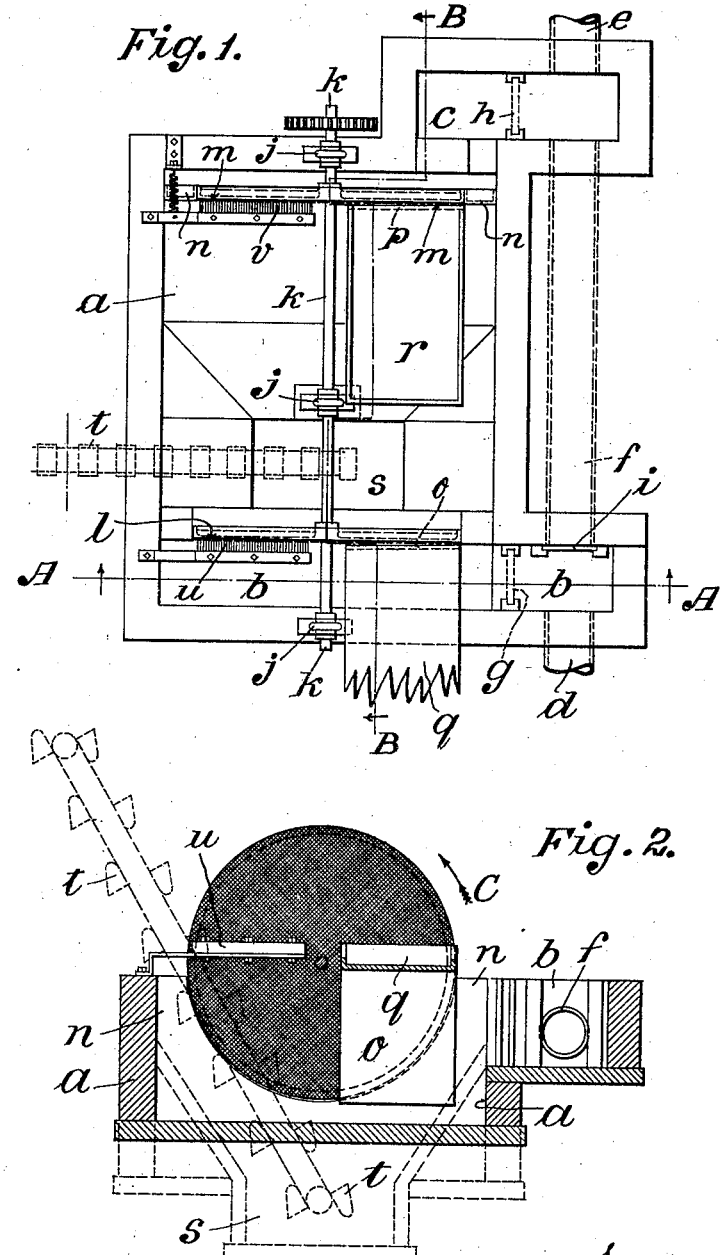

UNITED STATES PATENT OFFICE.

EDGAR VINCENT CHAMBERS AND THOMAS CHARLES HAMMOND, OF HUDDERSFIELD, ENGLAND.

APPARATUS FOR SEPARATING AND RECOVERING FIBERS AND THE LIKE FROM LIQUIDS.

1,079,975.   Specification of Letters Patent.   Patented Dec. 2, 1913.

Application filed March 19, 1913. Serial No. 755,488.

*To all whom it may concern:*

Be it known that we, EDGAR VINCENT CHAMBERS and THOMAS CHARLES HAMMOND, subjects of King George V of Great Britain, residing at Huddersfield, in the county of York, England, have invented certain new and useful Improvements in Apparatus for Separating and Recovering Fibers and the like from Liquids, of which the following is a specification.

Our invention relates to filtering or straining apparatus of the type in which a revolving reticulated cylinder or disk is employed to separate solids from liquids, as in the treatment of sewage or other liquid, and comprises an improved construction and arrangement of apparatus for recovering wool or other fibers from liquids by means of which all fibers and the like are removed from the liquid and the wool or other fibers collected or recovered separately from any dirt, sand, seeds, or other foreign matter.

According to the arrangement of the apparatus in carrying out our invention, the liquid is caused to flow through one or more perforated or reticulated screens revolving in a plane at right angles or substantially at right angles to the direction of the flow of the liquid and the essential feature of our invention is that with the screen or with each screen there coöperates a fixed upstanding board or surface arranged in proximity to the surface of the screen. The fibers which adhere to or become entangled in and carried up by the screen as it rotates are carried up between the fixed board or surface and the screen, and the movement of the latter with respect to the fixed surface causes the fibers to become more or less matted together or felted and at the same time squeezed so that they are delivered in a relatively dry state and in a suitable condition for handling.

We shall herein describe our improvements as arranged and adapted to deal with the liquor or effluent from wool washing or like machines.

In the accompanying drawings:—Figure 1 is a plan view of the embodiment referred to; Fig. 2 is a cross section on the line A—A, Fig. 1, looking in the direction of the arrows, and Fig. 3 is a longitudinal section of the apparatus taken on the line B—B, Fig. 1.

Referring to the drawings, we employ, in the embodiment to be described, a suitable tank or vessel $a$ having an inlet chamber $b$ and an outlet chamber $c$. A drain pipe $d$ communicates with the inlet chamber and a drain pipe $e$ with the outlet chamber. A pipe $f$ connecting the inlet and outlet chambers enables the liquid or effluent, when so desired, to be run straight off through the pipes $d$, $f$ and $e$ without being passed through the tank or vessel $a$, by closing the gates or valves $g$, $h$ in the inlet and outlet chambers respectively. By opening the gates or valves $g$, $h$ and closing a gate or valve $i$ controlling the entrance to the pipe $f$, the liquid or effluent is caused to pass through the tank or vessel $a$ on its way to the drain pipe $e$. Supported in bearings $j$, $j$ above the tank or vessel $a$ is a shaft $k$ having secured thereon, in this instance two perforated or reticulated circular screens $l$ and $m$. The screen $l$ is preferably of coarser or more open mesh than the screen $m$ and is placed at the inlet end of the tank or vessel $a$, so that the liquid or effluent as it flows from the inlet chamber $b$ is compelled to flow through the said screen. The screen $m$ which is of relatively fine mesh, is placed at the outlet end of the tank or vessel, and a plate $n$ closes the space below the screen so that the liquid or effluent is compelled as it passes out of the tank or vessel to the outlet chamber, to flow through the said screen $m$. The shaft $k$ carrying the screens $l$ and $m$ is driven from any convenient source of motion to rotate the screens in the direction of the arrow C, Fig. 2. Arranged in proximity to that portion of the inlet surface of each screen which is moving upwardly, is an upstanding fixed board or surface $o$ or $p$, and at the upper end of each board or surface $o$ or $p$ is a respective inclined platform or board $q$ or $r$ to receive the recovered fibers. Behind the screen $l$ the tank or vessel $a$ is provided with a pit $s$ and dipping into the said pit is an elevator $t$ of suitable construction, which may conveniently be driven by chains and sprocket wheels from the shaft $k$. The floor of the tank or vessel is preferably inclined, as shown, toward the pit so that heavy matters, sinking to the bottom of the tank will gravitate into the pit. Brushes $u$ and $v$ respectively engage the surfaces of the screens $l$ and $m$ and serve to clear them of any fibers which may not be removed by the action of the boards or surfaces $q$ and $r$.

The action of the apparatus is as follows:—The liquid or effluent to be treated is admitted in any direction to the inlet chamber $b$ and flows through the interstices of the screen $l$ the longer fibers contained in the liquid or effluent being caught and retained by the screen. As the screen revolves, the caught fibers are carried in behind the fixed board or surface $o$ and the rubbing action set up by the movement of the screen with respect to the surface $o$ causes the fibers to be detached from the screen and to be rolled up and squeezed as the screen continues to revolve, until they reach the upper edge of the surface $o$ when they drop on to the platform $q$. As the screen $l$ is of comparatively large mesh, the shorter fibers and any dirt or foreign bodies which may be present are carried through the said screen into the tank or vessel. The dirt and foreign bodies settle to the bottom of the tank and gravitate into the pit $s$ from whence they are removed by the elevator $t$ while the shorter fibers are carried forward by the flow of the liquid or effluent to the screen $m$. As the liquid or effluent flows through this screen, which as before stated is of relatively fine mesh, the whole of the remaining fibers are caught and by the coöperation of the surface $p$ removed and delivered on to the platform $n$.

In cases where no dirt or heavy foreign bodies are present in the liquid or effluent, the elevator $t$ may be dispensed with. Where no solids are present in the liquid or effluent, one screen only with its respective upstanding fixed board, may suffice, but in most cases it is desirable to employ at least two screens as herein shown, and any such larger number of screens may be employed as may, in any particular case, be found desirable.

The boards $o$ and $p$ may be slightly inclined toward the screens if preferred.

The improvements can be applied to existing machines in which fibers are treated and it is essential to remove such fibers from the liquid at the conclusion of the process.

Having thus described our invention, what we claim as new and desire to secure by Letters Patent is:—

1. In a fiber separator, the combination, with a tank provided with an inlet and an outlet, of a separating disk of reticulated material journaled in the tank crosswise of the path of the liquid, and a stationary plane surface or board secured adjacent to that part of the front or inlet surface of the disk which moves upwardly in the tank.

2. In a fiber separator, the combination, with a tank provided with an inlet and an outlet, of a separating disk of reticulated material journaled in the tank crosswise of the path of the liquid, a stationary plane surface or board secured adjacent to that part of the front or inlet surface of the disk which moves upwardly in the tank, and a stationary brush which engages with that part of the front surface of the disk which moves downwardly in the tank.

3. In a fiber separator, the combination, with a tank provided with an inlet and an outlet, of a plurality of separating disks of reticulated material journaled in the tank crosswise of the path of the liquid, said tank having also a receptacle for dirt arranged at its middle part between the said disks and below the level of its bottom, and stationary plane surfaces or boards secured adjacent to those parts of the front or inlet surfaces of the said disks which move upwardly in the tank.

In testimony whereof we affix our signatures in the presence of two witnesses.

EDGAR VINCENT CHAMBERS.
THOMAS CHARLES HAMMOND.

Witnesses:
   THOMAS H. BARRON,
   FRANK LEWIN.

---

Copies of this patent may be obtained for five cents each, by addressing the "Commissioner of Patents, Washington, D. C."